UNITED STATES PATENT OFFICE.

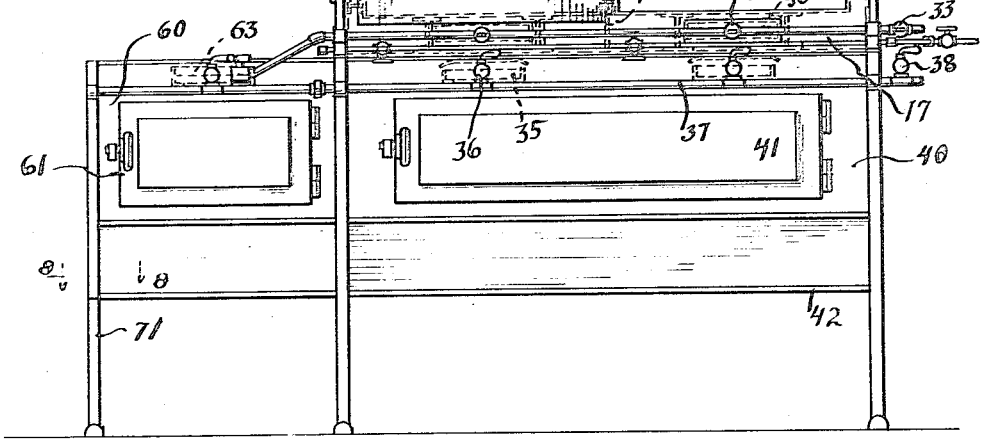
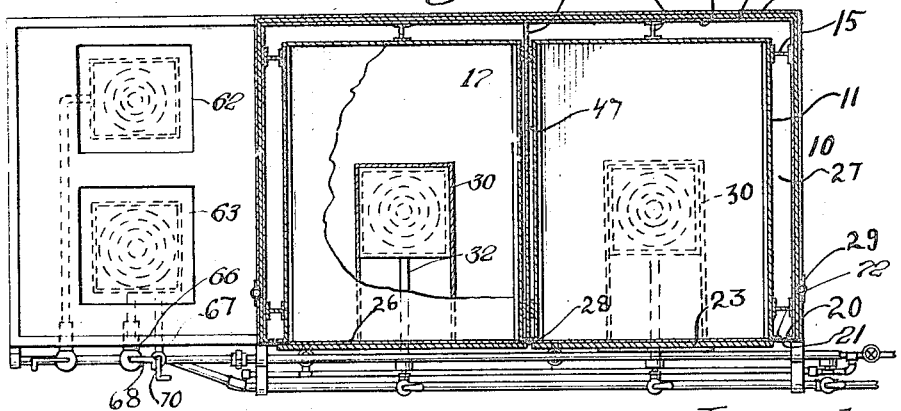

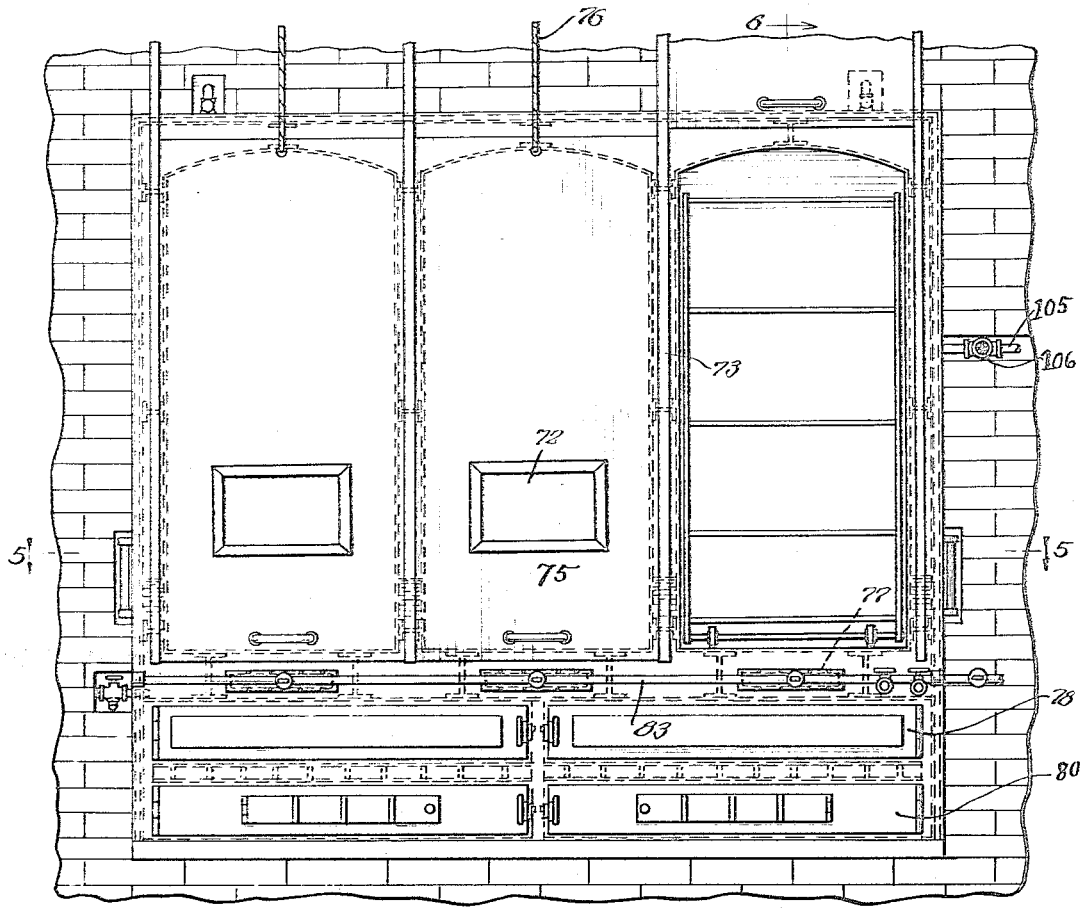

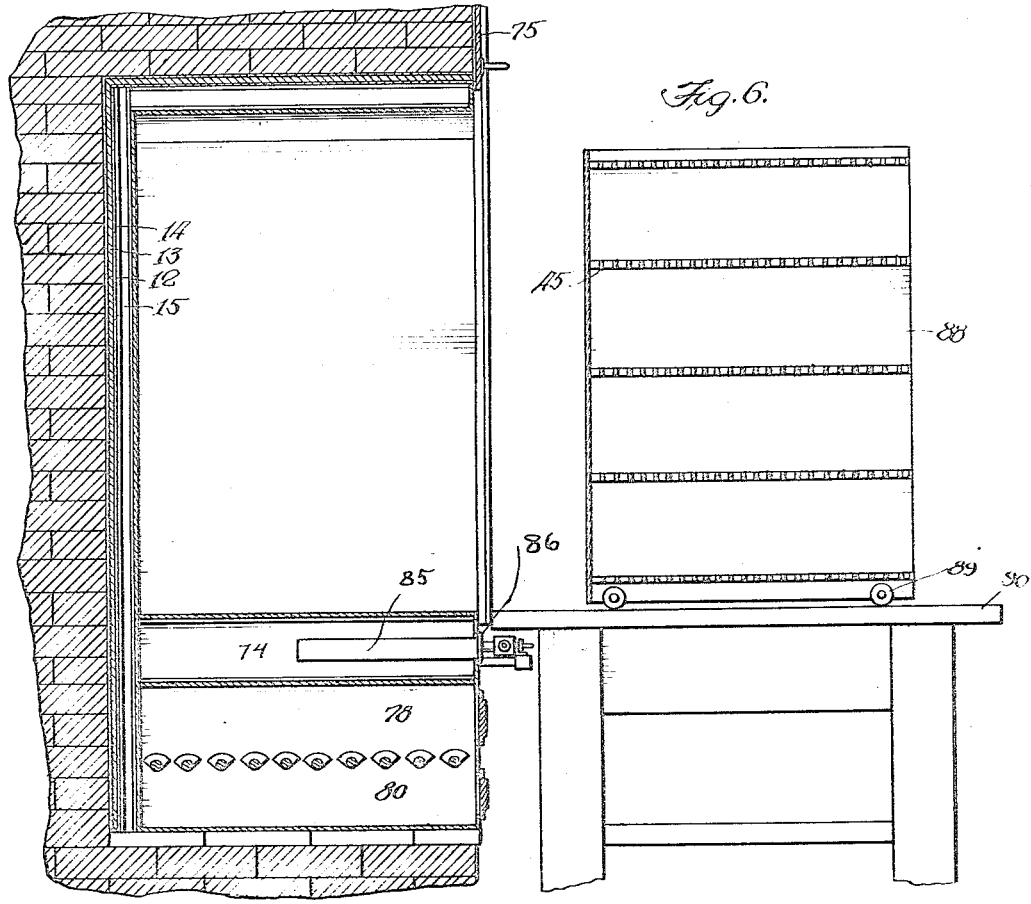
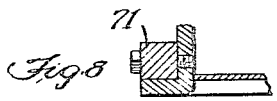
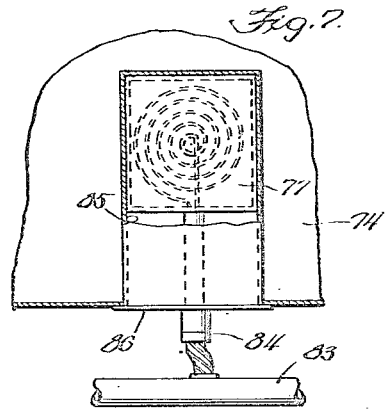
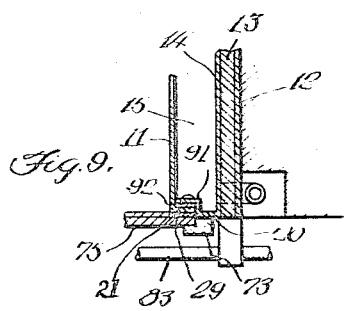

JULIUS E. HETTINGER, OF CHICAGO, ILLINOIS.

STOVE.

1,384,064.  Specification of Letters Patent.  Patented July 12, 1921.

Application filed March 9, 1920. Serial No. 364,413.

*To all whom it may concern:*

Be it known that I, JULIUS E. HETTINGER, a citizen of the United States, residing at Chicago, in the county of Cook and State of Illinois, have invented certain new and useful Improvements in Stoves, of which the following is a specification.

This invention relates to stoves, and has for its object the production of a stove that may be used for all of the ordinary purposes for which ordinary stoves are used, and which is also particularly adapted for cooking or baking where it is desired to heat the substance to a definite temperature, and to maintain that temperature uniform over long periods of time. A further object is to provide a stove which may be used as a fireless cooker, or as a means for maintaining the high temperature of the article which is being cooked for a long time after the fire has been turned off. A further object is to provide suitable means so that either electricity or gas or coal may be used for the same heating purposes. Other objects of the invention will be apparent from a consideration of the accompanying drawings and the description thereof.

Of the accompanying drawings Figure 1 is an elevation of a stove which embodies the features of my invention; Fig. 2 is a cross-section of the same along the line 2—2 of Fig. 1; Fig. 3 is a detail sectional view of one of the heating elements of the stove; Fig. 4 is an elevation of a modified form of stove; Figs. 5 and 6 are cross-sections along the lines 5—5 and 6—6 of Fig. 4, with certain elements added; and Figs. 7, 8 and 9 are detail sectional views of the heater, leg and walls, respectively, Fig. 8 being along the line 8—8 of Fig. 1.

The stove which I provide comprises an outer casing 10 and an inner casing 11. The outer casing is insulated in order to prevent the heat from the interior of the stove from passing outwardly, and comprises a sheet iron layer 12 on the outside, a layer of non-conducting substance, such as asbestos 13, and an inner layer or sheet of suitable metal 14. The inner casing may be composed of any suitable metal such as galvanized steel. These two casings are spaced apart in any suitable manner, as for example by means of the beams 15 which are suitably supported by the walls forming the sides and rear of the casing 10. The position and size of the rails or guides 15 are such that when desired the inner casing may be slipped easily into or out of the outer casing, guided by the rails. Although the stove may be composed of a single inner casing, or as many as may be desired, for the purposes of illustration I have shown two inner casings inclosed in the outer casing, the two inner casings being entirely separated by a partition 16.

Beneath the inner casing 11, but within the outer casing, is a water chamber 17 which, in this instance, is divided into two compartments by means of the partition 16 which extends to the bottom of the casing 10. The front of the casing 10 has overhanging flanges 20, and the casing 11 has outwardly extending flanges 29, and the spaces between the two casings are closed by means of plates 21 and 22, which extend vertically on both sides of the front opening of the casing 10 and across the top. These plates form a frame which closes the space between the two casings, and fits snugly against the flanges 20 and 29, on the respective casings, and is fixed by any suitable means to the flanges. The openings thus formed by these plates 21 and 22 are closed normally by means of doors 23. (The right hand door is shown removed in Fig. 1.) The doors are supported by the hinges 25 fixed to the partition 16. These doors are arranged to fit snugly against the plates 21, so as to form a substantially gas tight closure of the casing 11. On the inner side of the doors are sheets 26 of non-conducting substances such as asbestos.

Each of the compartments of the chamber 17 is adapted to hold water; and the chambers 27, formed between the walls of the two casings 10 and 11, are substantially hermetically sealed by the plates 21 and 22, and are adapted to hold steam, these chambers opening directly into the compartments of the chamber 17, it being understood that the partition 16 completely divides the steam chamber and the water chamber into two compartments, each steam chamber, however, communicating freely with its respective water chamber.

Within the water chambers are mounted any suitable form of heating means such as the electric heaters 30, which are inclosed in any suitable manner, so that they will not be injured by the water, and which have switches 31 controlling the passage of the electric current through the conduits 32 to the heaters, each of the heaters having its own switch 31, and the master switch 33 controlling both of the heaters, or more, if more than two heaters are used. Beneath the water chamber other heating means are used, such as the gas heaters 35 controlled by the gas valves 36 mounted in the pipe 37, all of the gas heaters being controlled by a master gas valve 38.

Beneath the heaters 36 is a casing 40 which incloses a chamber normally closed by the door 41, in which any articles may be placed when desired to be kept warm, while the cooking process is going on, or for any other reasons. Above the ovens 11, is another somewhat similar chamber, but which during the cooking process is much hotter than the chamber of casing 10. And below the casing 40 is a shelf 42 which may be used for any suitable purposes.

As may be implied by the foregoing description, the stove is to be operated as a steam cooking means. When in use the articles to be cooked are placed in the casings, or ovens 11, on suitable shelves 45 or otherwise, and the doors are closed and tightly fastened by means of the latches 46. The electric heaters, or the gas heaters, as the case may be, are then set into operation, and the water is heated to the boiling temperature and the steam generated therein passes into the steam chambers 27 including the narrow chambers 47 between the partition 16 and the respective ovens, and it is to be noted that the steam chamber extends over the oven between the roof 48 of the casing 10 and the roof 50 of the casing 11. So that when in operation the ovens are entirely surrounded by steam except on the front sides, and these sides are insulated by means of the sheets 26 so that but little heat passes off through the doors.

In this manner the temperature of the oven can be raised to any reasonable amount, depending upon the temperature of the steam generated. To maintain this temperature substantially uniform I provide safety valves which may be of any suitable form, such as the ordinary safety pop valves 52, which, of course, may be regulated as to operate at any desired steam pressure. By these means the temperature of the steam may be maintained substantially uniform, and danger of bursting the walls of the steam chamber is eliminated. Also indicating thermometers may be inserted in any suitable manner. It will thus be seen that, by means of this apparatus, together with any suitable thermostatic means for controlling the supply of heat according to the temperature of the steam, if desired, the temperature of the ovens may be raised to the desired amount, and may be maintained thus uniform over as long a period of time as may be desired. And by having the ovens entirely surrounded by steam in the manner described, and so thoroughly insulated from the outer air, it is apparent that the temperature throughout the ovens will be substantially uniform, so that all portions of the substances being cooked will be heated to substantially the same temperature.

For the purpose of ordinary cooking without a steam chamber, I provide on the side of the main stove an auxiliary stove 60 having any suitable form of oven or warming chamber 61 and heating means 63. The heating means may be of any suitable nature, but I have provided, for both the steam heating stove and for the auxiliary stove heating means, gas and electricity, so that either of these may be used if desired. On the auxiliary stove I provide a heating member 63 which comprises an ordinary form of gas heater 64 and an electric heater 65 both combined in the same casing. The gas heater is supplied in a usual manner by means of the gas pipe 66 and the electric heater is supplied with electricity through the conduit 67, the gas being controlled by a gas valve 68 and the electricity by a switch 70, the arms to the valve and switch being so arranged, as indicated in Fig. 2, that only one at a time can be in use. As indicated the gas valve 68 is open, but the electric switch cannot be closed so as to use the electricity, because of the interference of the handle of the gas valve. On the other hand when the electric switch is closed so as to use the electric burner, the switch arm is turned to the left and thus prevents the valve handle from being operated to open the gas valve.

When it is desired to use gas with this burner the gas burner 64 is placed upward; and the gas turned on and operated in the ordinary manner. When it is desired to use the electric heater the burners are inverted with the electric heater uppermost. A detachable plug 100 is fixed to the electric heater, so that the heater may be detached from the electric circuit wires; and the gas pipe connection is made in the ordinary manner so that the burner may be readily disconnected from the feeder 66. A second gas burner is supplied for the rear portion of the auxiliary stove.

The stove 61 may be mounted on either side of the steam stove, by disconnecting the device, and by removing the left hand legs 71 and placing them on the right hand side of the auxiliary stove, instead of on the left hand as shown, when the auxiliary stove is placed on the left hand side of the main stove. The legs 71 are removably attached to the stove as indicated in Fig. 8.

The stove which I have hereinabove described is of a more or less portable nature and is adapted to be used for household purposes. For a more stationary type of stove to be used where a large amount of cooking is to be carried on, I provide the stove indicated in Figs. 4 and 5, which in general is similar to the steam stove hereinabove described, but is larger, and ordinarily has more compartments, and has doors 75 which are raised when open, being slidably mounted in guides 73 and supported by cables 76 or in any suitable manner, the cables passing over pulleys and being counterweighted. Spy glasses 72 allow the interior of the ovens to be inspected when desired. This stove is arranged with electric heaters 77 inclosed in the water chamber 74, and below the water chamber is a suitable casing 78 which incloses a coal heater, the chamber 80 forming an ash receptacle for the coal heater; and suitable means for passing the smoke and consumed gas from the coal stove is provided, such as by means of the plate 87 in the rear of the stove, having an opening 82 for a chimney.

The electric heaters 77 are connected to the electric wires in the conduits 83 by means of detachable plugs 84, and the heaters are in casings 85 in the water chambers so that the heaters may be conveniently removed by removing the plates 86 which are fixed to the front walls of the water chambers. Removable racks 88 are provided having shelves 45 for supporting the articles to be baked, and these racks are on rollers 89 so that they may be conveniently rolled out of the ovens onto shelves 90 or tables. In this way the ovens can be very quickly emptied and filled again without having the doors open for any material length of time, and hence but little heat is lost in the change. It will also be understood that with either type of oven, after the articles to be cooked are heated through, by turning off the burners the heat will be retained in the ovens for a very material length of time, so that the ovens form fireless cookers whenever desired, or the articles may be kept warm in the ovens for many hours.

Some of the details of the structure of the stoves are not shown in Figs. 1, 2, 4, and 5, but are shown in the enlarged detail views. For instance the details of the walls of the oven of Figs. 4 and 5 are shown in Fig. 9. Fixed to the sheet 14 is a flange 91, which is connected to the flange 29 on the oven casing 11, with a gasket 92, between the two flanges.

If desired, steam from any source of supply may be passed into the steam chamber by any suitable means such as a pipe 105 and a valve 106, and the heaters then may not be used. One purpose of two heating systems, such as the electric heaters and the coal heaters, is to more completely control the cooking process, by using both heaters either simultaneously or only one alone.

I claim as my invention:

1. In a stove, a steam chamber having the front side open, a water chamber beneath and opening into said steam chamber, an oven in said steam chamber, the walls of said oven being spaced from the walls of said steam chamber, the front wall of said oven being nearly flush with the front of said steam chamber, means for sealing the space between the front of said oven and the front edges of said steam chamber, an electric heater mounted in said water chamber, and a gas heater mounted beneath said water chamber.

2. In a stove, a casing, a gas burner and electric wires in said casing, and means for passing gas to said burner and electric energy to said wires, said casing being arranged so as to be inverted.

In testimony whereof, I hereunto set my hand.

JULIUS E. HETTINGER.